(12) United States Patent
Zhu

(10) Patent No.: US 12,717,309 B2
(45) Date of Patent: Aug. 25, 2026

(54) COMPOSITION OF HOME SYSTEM FOR REALIZING WHOLE HOUSE INTELLIGENCE, AND METHOD FOR REALIZING WHOLE HOUSE INTELLIGENCE

(71) Applicant: Baodong Zhu, Beijing (CN)

(72) Inventor: Baodong Zhu, Beijing (CN)

(*) Notice: Subject to any disclaimer, the term of this patent is extended or adjusted under 35 U.S.C. 154(b) by 374 days.

(21) Appl. No.: 18/546,021

(22) PCT Filed: Feb. 10, 2021

(86) PCT No.: PCT/CN2021/076496
§ 371 (c)(1),
(2) Date: Aug. 10, 2023

(87) PCT Pub. No.: WO2022/170555
PCT Pub. Date: Aug. 18, 2022

(65) Prior Publication Data

US 2024/0134353 A1 Apr. 25, 2024

(51) Int. Cl.
*G05B 19/00* (2006.01)
*G05B 19/418* (2006.01)
(Continued)

(52) U.S. Cl.
CPC ......... *G05B 19/418* (2013.01); *G06F 3/0412* (2013.01); *G10L 15/22* (2013.01);
(Continued)

(58) Field of Classification Search
CPC .......... G05B 19/418; G05B 2219/2642; G05B 15/02; G05B 19/00; G06F 3/0412;
(Continued)

(56) References Cited

U.S. PATENT DOCUMENTS 12,028,182 B2 * 7/2024 Zhu .......................... H04W 4/80
2016/0249286 A1 * 8/2016 Chen ..................... H04W 48/20
(Continued)

FOREIGN PATENT DOCUMENTS

CN 104536301 A 4/2015
CN 206249030 U 6/2017
(Continued)

OTHER PUBLICATIONS

PCT/CN2021/076496 International Search Report, Oct. 26, 2021.
PCT/CN2021/076496 Written Opinion Report, Oct. 26, 2021.

*Primary Examiner* — Shardul D Patel
(74) *Attorney, Agent, or Firm* — NGUYEN TARBET IP LAW

(57) ABSTRACT

According to a technical solution of a smart home, a complete smart home system is composed of human-machine interaction devices and products connected thereto; a human-machine interaction device is placed in a room as needed, and the human-machine interaction device in a certain room is only connected to products of the room or area and controls same; and the human-machine interaction devices are interconnected to each other, and products of rooms or areas where other human-machine interaction devices are located can be controlled by means of other human-machine interaction devices.

13 Claims, 3 Drawing Sheets

(51) Int. Cl.
*G06F 3/041* (2006.01)
*G10L 15/22* (2006.01)
*H04W 84/18* (2009.01)

(52) U.S. Cl.
CPC *G05B 2219/2642* (2013.01); *G10L 2015/223* (2013.01); *H04W 84/18* (2013.01)

(58) Field of Classification Search
CPC .. G10L 15/22; G10L 2015/223; H04W 84/18; Y02P 90/02
USPC ............................................... 701/19; 700/19
See application file for complete search history.

(56) References Cited

U.S. PATENT DOCUMENTS

2020/0214112 A1* 7/2020 Magielse ................ G10L 15/22
2020/0372992 A1* 11/2020 Wu ..................... G06F 16/9554

FOREIGN PATENT DOCUMENTS

CN 206559706 U 10/2017
CN 111176124 A 5/2020
CN 111294258 A 6/2020

* cited by examiner

COMPOSITION OF HOME SYSTEM FOR REALIZING WHOLE HOUSE INTELLIGENCE, AND METHOD FOR REALIZING WHOLE HOUSE INTELLIGENCE

CROSS-REFERENCE TO RELATED APPLICATION

This application is a 371 and claims benefit of Chinese PCT Application No. PCT/CN2021/076496 entitled "COMPOSITION OF HOME SYSTEM FOR REALIZING WHOLE HOUSE INTELLIGENCE, AND METHOD FOR REALIZING WHOLE HOUSE INTELLIGENCE" filed with Chinese Patent Office on Feb. 10, 2021, the entire contents of which are incorporated by reference in the present application.

The present disclosure claims the priority of Chinese Patent Application No. 202180000371.8 entitled "COMPOSITION OF HOME SYSTEM FOR REALIZING WHOLE HOUSE INTELLIGENCE, AND METHOD FOR REALIZING WHOLE HOUSE INTELLIGENCE" filed with Chinese Patent Office on Feb. 10, 2021, the entire contents of which are incorporated by reference in the present application.

TECHNICAL FIELD

The present disclosure relates to the technical field of Internet of Things, in particular to the field of smart homes.

BACKGROUND

A smart home has emerged for many years, but till now, whole house intelligence has not been accomplished actually, let alone true whole house intelligence. Existing technical solutions are: the first solution is a centralized control device (called a central controller or an intelligent panel or other names), the second solution is the centralized control device plus one or more ZigBee gateways or infrared or ZigBee to infrared remote control, the third solution is a scene panel and the like plus a gateway playing a role of central control, the fourth solution is a smart speaker or a voice panel plus a gateway plus an infrared repeater, and the other solution is a combination of these solutions. In these solutions, as for a mode for implementing control over whole-house products through the centralized control device, a person, intending to control the products, needs to come to the centralized control device, needing to enter a room where the device is located even if there is a voice function, and thus a disadvantage is obvious. In the other solutions, an entire system crashes and cannot run when getting rid of the gateway. Besides, each solution cannot provide different services according to different demands of different family members, for example, when getting up in the night, some family members may expect to turn on a lamp, but some family members may expect not to turn on the same lamp, and the like, demands of a user cannot be actively learned, and certainly, true intelligence cannot be accomplished; and actually, each solution does not realize whole house intelligence, for example, products in any place in the home can be controlled at will in any place in the home, and many solutions adopt a backward mode of mobile phone assistance. This is why the smart home has not come into vogue over so many years.

SUMMARY

To solve the problems in the current smart home, the present disclosure provides a new solution.

First, System Composition

In the present disclosure, a complete smart home system is composed of a human-computer interaction device and a product connected therewith and may further include a product disconnected with the human-computer interaction device and non-physical data or information related to a whole house, a home, family members and the like.

The human-computer interaction device is placed in a room as needed, and products in the room are controlled or managed by the human-computer interaction device. As a room is small in area or due to a function factor, a room or a position such as a hallway, stairs, an utility room, a courtyard and the like where a human-computer interaction device is not placed or does not need to be placed may constitute a region together with the room where the human-computer interaction device is placed, and products in the region are controlled or managed by the human-computer interaction device in the region.

The human-computer interaction device includes a processing unit, a storage unit, a communication unit, an audio unit and a power source unit. The communication unit is further divided into a first communication unit and a second communication unit, the first communication unit is connected with only connected products of the room or the region where the human-computer interaction device is placed, and the second communication unit is connected with only second communication units of other human-computer interaction devices of other rooms or regions. The first communication unit includes one or more of short-range wireless communication modules such as Wi-Fi, ZigBee, Bluetooth, Zwave, infrared or radio frequency, and the second communication unit includes one of short-range wireless communication modules such as Wi-Fi, ZigBee, Bluetooth or Zwave. The first communication unit may further include various wired connection modes, for example, one or several modules such as RS-485, KNX or power-line communication (PLC), and the second communication unit may further include one of various wired connection modes such as power-line communication (PLC), RS-485 or KNX. Two human-computer interaction devices are connected directly or indirectly through the second communication unit, for example, directly connected through Wi-Fi, or indirectly connected in a relay mode through ZigBee.

The human-computer interaction device may further include a display unit, a sensing unit, a camera unit and a touch screen unit. The sensing unit may include one or more of gravity, acceleration, a gyroscope, light, infrared, microwave, ultrasonic wave, temperature and humidity, carbon monoxide, carbon dioxide, formaldehyde, TVOC, PM2.5, PM10 or the like.

A camera of the camera unit and a microphone of the audio unit may each have a cover capable of being opened or closed manually so as to protect privacy of a user, an opening and closing state signal accesses the processing unit, and the processing unit may perform linkage of at least one of speech or a screen display thereby or relevant processing; and an indicator light may further be included and can be in linkage with an opening and closing state.

Second, Implementing Method

Human-computer interaction devices start, a name of a room or region where each human-computer interaction device is placed and information of products connected therewith in the room or region are inputted into the human-computer interaction device respectively, association is established between the name and the product information, information related to the products may be found through the name, the name may also be found through the product information, and saving is performed after inputting is completed; afterwards, connection is established between all the human-computer interaction devices, the name is transmitted to the other human-computer interaction devices to be saved, and the product information may further be transmitted to the other human-computer interaction devices to be saved; or a name of a room or region where each human-computer interaction device is placed and information of products connected therewith in the room or region are inputted into any one of human-computer interaction devices, an association relation is established between the name and the product information to be saved, afterwards, connection between all the human-computer interaction devices is established, and then these names and product information are transmitted to the other human-computer interaction devices to be saved. A function name, expected to be implemented for the user, of linkage of two or more products in the same room or region or linkage of products of two or more rooms, a name of a room or region and a specific product action are inputted into any one of human-computer interaction devices to be saved as an instruction; and immediately transmitted to the other human-computer interaction devices to be saved after completion. Each human-computer interaction device is placed in a room as needed after these items are completed, or each human-computer interaction device may be placed first and then these items are performed. When information saved in each human-computer interaction device changes, the change is immediately sent to the other human-computer interaction devices for corresponding updating.

Each human-computer interaction device may further store various information of the products disconnected therewith in the present room or region, wherein, the various information is associated with a name of the present room or region; and may further store various non-physical data or information; and establish association with a name of a certain room or region when the data or the information is related to the room or region; and the various information of the disconnected products and the non-physical data or information may be found through the name by means of the association, or vice versa. Each human-computer interaction device may send these information or data to the other human-computer interaction devices.

The human-computer interaction device has artificial intelligence and can automatically learn living habits of the user and manage and control all the products thereby so as to meet different demands of the user. In general, each human-computer interaction device automatically receives information sent by each connected product of the present room or region or actively queries the information of each connected product of the present room or region, or/and sends, according to data detected by its own sensing unit, a related instruction after judgment and processing to the connected products of the room or region where the human-computer interaction device is placed or sends a related instruction to the other human-computer interaction devices, receives return information of each connected product or the other human-computer interaction devices or actively queries or detects related information of a certain effect supposed to be achieved after the connected product executes the instruction, performs displaying or broadcasting when an abnormal condition or failure occurs, and sends information to a mobile device of the user when detecting that no person is in the room; and a certain human-computer interaction device usually performs corresponding judgment or/and detection after receiving instructions sent by the other human-computer interaction devices and then performs processing.

Each human-computer interaction device may receive an instruction inputted by the user whenever possible, parses the instruction and then sends a corresponding instruction to control or query each product, and the instruction includes one or more of speech, screen touch, human body action or press buttons.

In a case that the human-computer interaction device is in an artificial intelligence mode or in a mode of receiving a manual instruction, a human-computer interaction device in a certain room or region, when intended to control a certain connected product of the room or region or query a working condition of the certain connected product, sends a control or query instruction to the product so as to implement a control or query function. The human-computer interaction device in the certain room or region, when intended to control the connected products of the other rooms or regions or query working conditions of these connected products, sends a control or query instruction including names of the other rooms or regions to the human-computer interaction devices of the other rooms or regions, the control or query instruction is implemented by the human-computer interaction device so as to implement a control or query function for the connected products of the other rooms or regions. When the human-computer interaction device in the certain room or region is intended to implement linkage of two or more connected products of the room or region or any one of the other rooms or regions, or implement linkage of the connected products of two or more rooms or regions, only a certain linkage function name needs to be sent, so linkage of the connected products of the room or region or any one of the other rooms or regions or two or more rooms or regions may be implemented, and the linkage includes a query function so as to realize whole house intelligence; and the two or more rooms or regions may not include the room or region where the human-computer interaction device receiving the instruction is placed. Each human-computer interaction device usually performs corresponding judgment or/and detection after responding to the instruction of the user and then performs processing, or the certain human-computer interaction device usually performs corresponding judgment or/and detection after receiving the instructions sent by the other human-computer interaction devices and then performs processing.

Each human-computer interaction device performs various operations and processing on various information of products disconnected therewith or non-physical information or data autonomously or by responding to the instruction of the user or/and by sending a corresponding instruction to the other human-computer interaction device, so as to implement various intelligent managements on the products disconnected therewith in a whole house and the non-physical data or information, and achieve generalized whole house intelligence beyond common whole house intelligence.

In order to prevent disorder possibly caused when the plurality of adjacent human-computer interaction devices simultaneously respond to a speech instruction of the user, one of two ways may be adopted as a solution: 1, the adjacent human-computer interaction devices adopt different wake-up words. 2, The human-computer interaction device determines whether to respond to the speech instruction by detecting whether a person is in a room or a region where the human-computer interaction device is placed, which may adopt one or more detection technologies including sound wave, infrared, microwave and camera.

Whether the human-computer interaction device adopts automatic intelligent control or the user sends the instruction to the human-computer interaction device, the human-computer interaction device can display or broadcast a working condition of a controlled product or feedback information obtained after sending an instruction, failure or abnormal condition information stands out to be displayed or broadcast, and information is sent to a mobile terminal of the user if it is detected that no person is at home.

Various data collected by the sensing unit of the human-computer interaction device is displayed on a display screen, and when the user needs these data on the other human-computer interaction devices, the other human-computer interaction devices send instructions including the name of the room or region where the human-computer interaction device is located and the needed data, and the human-computer interaction device, after receiving the instructions, sends these data to the other human-computer interaction devices to be displayed or speech-broadcast. Each human-computer interaction device may query and broadcast its own working condition.

The present disclosure provides a technical solution different from an existing solution, and can realize whole house intelligence, true intelligence and true whole house intelligence based on the both.

DETAILED DESCRIPTION

First, System Composition

Figure 1:
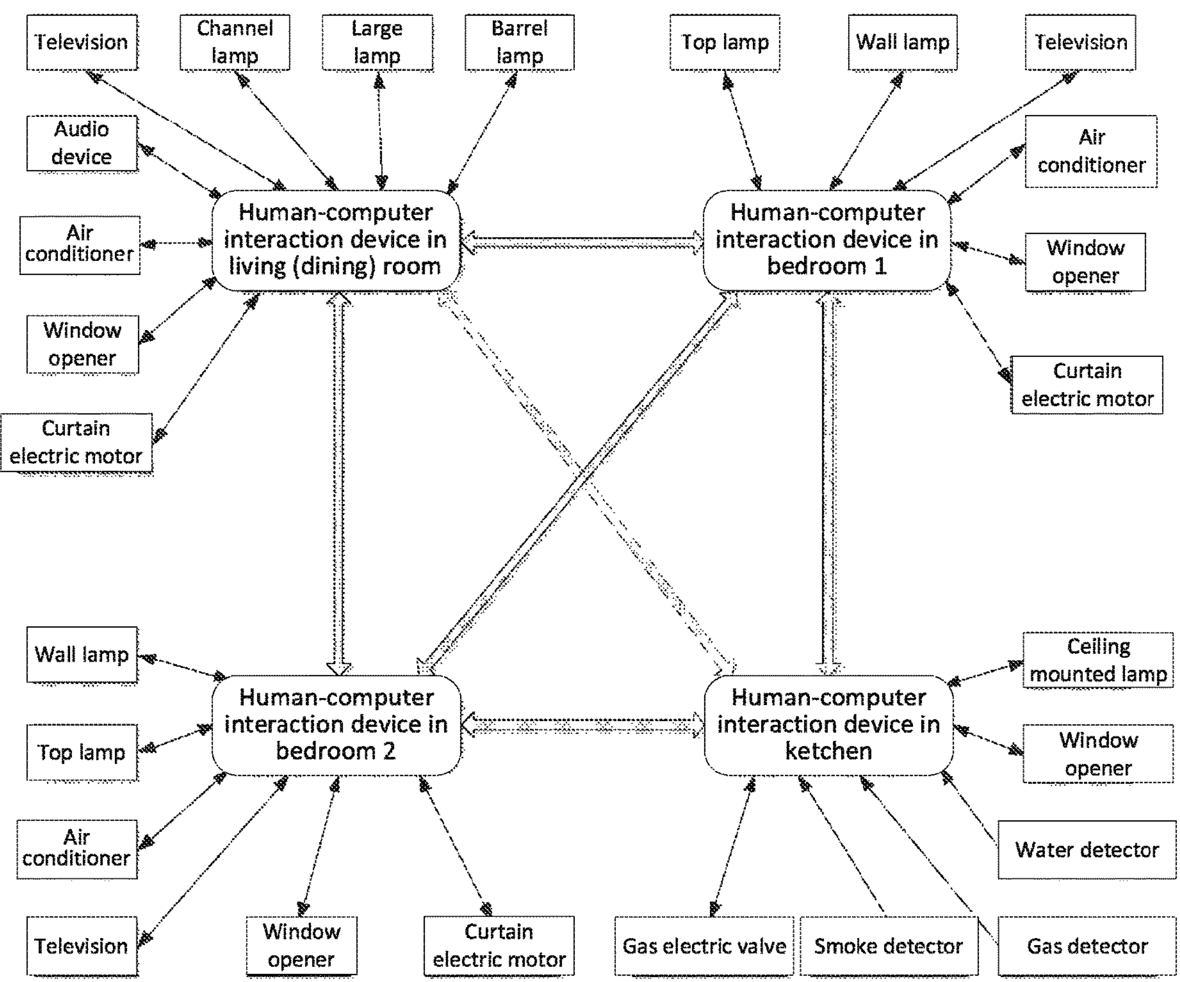
FIG. 1 is a diagram of a system composition.
Figure 2:
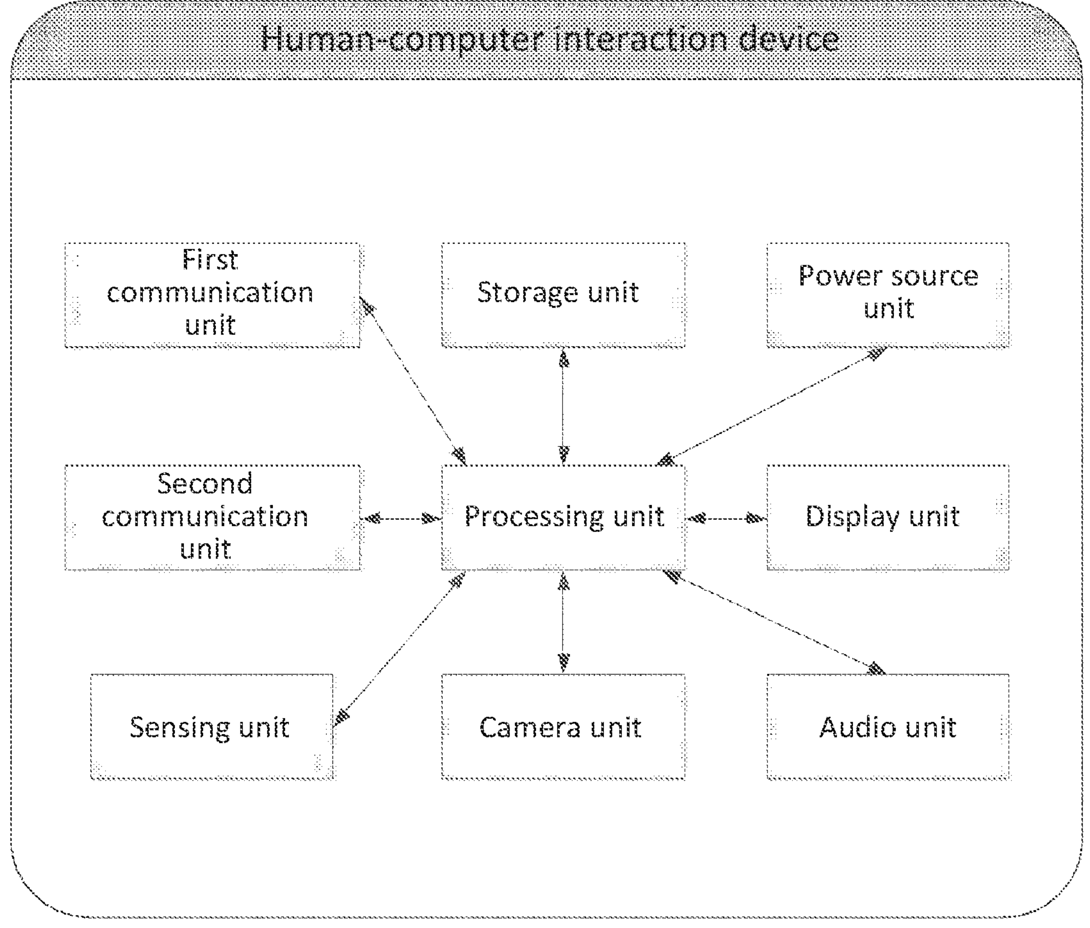
FIG. 2 is a diagram of a human-computer interaction device.
Figure 3:
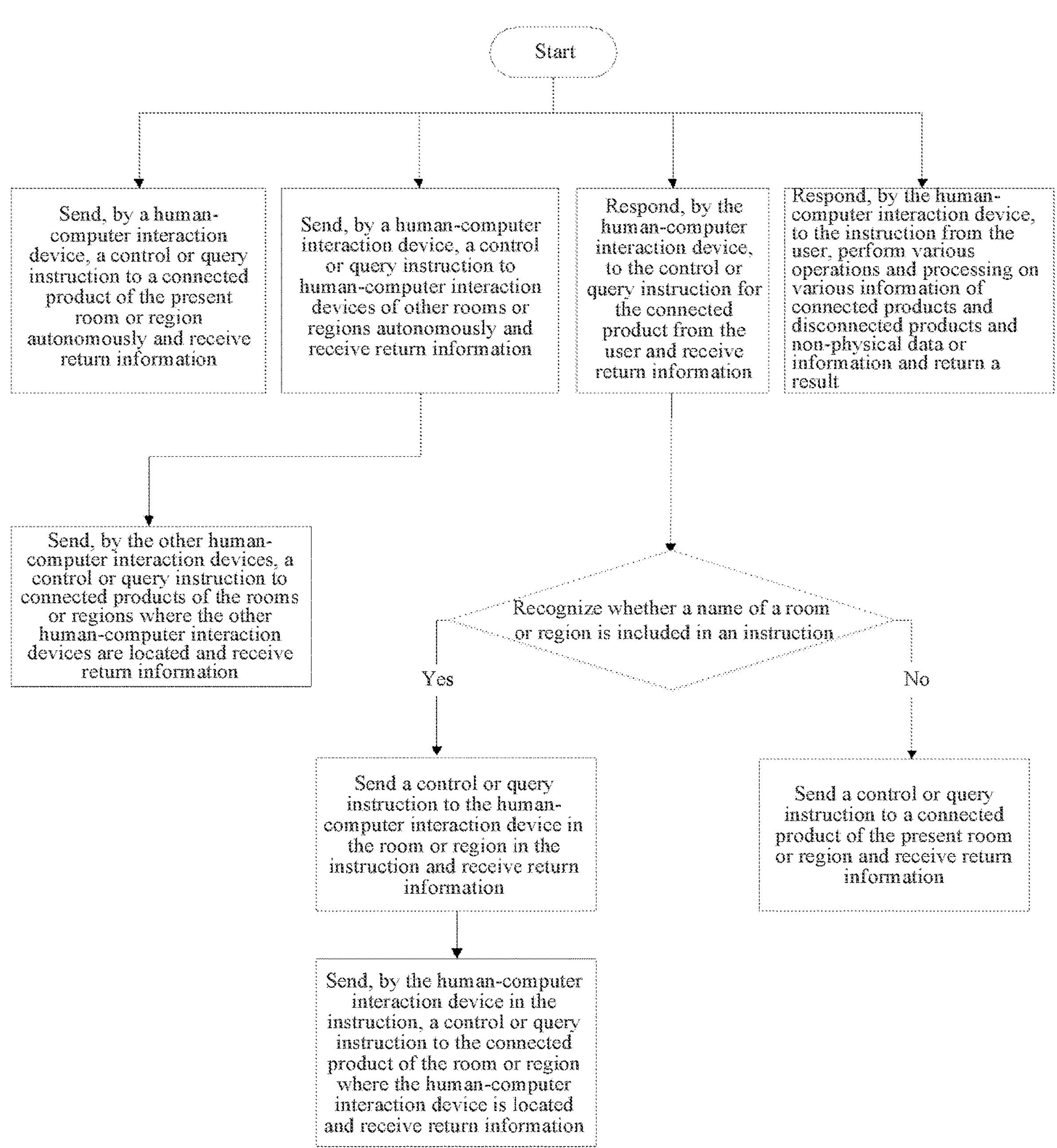
FIG. 3 is a diagram of system running.

In the present disclosure, a complete smart home system is composed of human-computer interaction devices and products connected therewith and may further include products disconnected with the human-computer interaction devices and non-physical data or information related to a whole house, a home and family members.

The human-computer interaction device is placed in a room as needed, and products in the room are controlled or managed by the human-computer interaction device. As a room is small in area or due to a function factor, a room or a position such as a hallway, stairs, an utility room, a courtyard and the like where a human-computer interaction device is not placed or does not need to be placed may constitute a region together with the room where the human-computer interaction device is placed, and products in the region are controlled or managed by the human-computer interaction device in the region.

The human-computer interaction device includes a processing unit, a storage unit, a communication unit, an audio unit, a sensing unit and a power source unit. The communication unit is further divided into a first communication unit and a second communication unit, the first communication unit is connected with only connected products of the room or the region where the human-computer interaction device is placed, and the second communication unit is connected with only second communication units of other human-computer interaction devices of other rooms or regions. The processing unit adopts an SoC of a high-performance Arm architecture, a flash memory in the storage unit adopts 4G eMMC5.1, an internal memory adopts 32G LPDDR4X, the audio unit includes a microphone and a speaker, the first communication unit includes ZigBee, Bluetooth, infrared and a 433M radio frequency module, the second communication unit includes a Wi-Fi module, a display unit adopts a 8-inch touch screen, the sensing unit includes light, gravity, acceleration, a gyroscope, infrared, temperature and humidity, carbon monoxide, carbon dioxide, formaldehyde, TVOC and a PM2.5 sensor, and a camera unit includes a front camera and a rear camera each having 8 mega pixels.

The cameras of the camera unit and the microphone of the audio unit each have a cover capable of being opened or closed manually, a cover opening and closing state signal accesses the processing unit, and the processing unit may perform linkage of at least one of speech or a screen display thereby or relevant processing, and a linkage content is, for example, “the microphone is covered”; and an indicator light may further be included and is in linkage with an opening and closing state.

Second, Implementing Method

The human-computer interaction devices start, a name of a room or region where each human-computer interaction device is placed and information of products connected therewith in the room or region are inputted into each human-computer interaction device respectively by speech or screen touch, for example, “living room. main lamp: 300 W, channel lamp: 30 W, barrel lamp: six each having 10 W, television: X make and 60 inches, air conditioner: X make and 2 HP” is inputted into a human-computer interaction device in the living room, the information of the products such as price and purchase time may be further inputted, an association relation is established between the name and the product information, which products are in the room or region and specific information of these products may be found through the name of the room or region, or in which room or region the products are placed is found through the product information, and saving is performed after inputting is completed; afterwards, connection is established between all the human-computer interaction devices, the name is transmitted from each human-computer interaction device to the other human-computer interaction devices to be saved, and the product information may further be transmitted to the other human-computer interaction devices to be saved; or a name of a room or region where each human-computer interaction device is placed and information of products connected therewith in the room or region are inputted into any one of human-computer interaction devices to be saved and then transmitted to the other human-computer interaction devices to be saved. A function name, expected to be implemented for the user, of linkage of two or more connected products in the same room or region or linkage of connected products of two or more rooms, a name of a room or region and a specific product action are inputted into any one of human-computer interaction devices to be saved as an instruction, for example, if the user intends to implement turning on a large lamp of a dining room during dining, playing music and closing a curtain, a linkage function name, namely, dining time (or meal is ready or the like), the name of the room or region, namely, the dining room, and a specific product action, namely, turning on the large lamp of the dining room, turning on an audio device and closing the curtain are inputted; for another example, if the user intends to open windows for ventilating all rooms, a linkage function name, namely, whole-house ventilation, the names of the rooms or regions (bedroom 1, bedroom 2, living room, kitchen, bathroom and the like), and the specific product action, namely, opening curtains and windows (of bedroom 1, bedroom 2, living room, kitchen, bathroom and the like) are inputted; an instruction such as "turning on large lamp and channel lamp of living room" is only a simple combination of single instructions and is not used as the linkage function name; and linkage includes a query function. Transmitting to the other human-computer interaction devices to be saved is immediately performed after completion. Each human-computer interaction device is placed in a room as needed after these items are completed, or each human-computer interaction device may be placed first and then these items are performed. If information saved in each human-computer interaction device changes, the change is immediately sent to the other human-computer interaction devices for corresponding updating.

Each human-computer interaction device may further store various information of products disconnected therewith in the present room or region, for example, a name of a cabinet and an internal structure thereof (for example, which cases there are), and the quantity and names, placement positions, prices, purchase time and the like of clothes or books, and associate it with the name of the present room or region; may further store various non-physical data or information, for example, a building year and maintenance condition of a house, a personal health file, household expenses and the like, and establish association with a name of a certain room or region if the data or information is related to the certain room or region. Each human-computer interaction device may send these information or data to the other human-computer interaction devices to be saved. The various information of each disconnected device or the non-physical data or information may be found through the name of the room or region by means of association, for example, which books there are and where a certain book is placed in bedroom 1 may be searched for; or vice versa, for example, which position of which room is maintained in the year before last.

The human-computer interaction device has artificial intelligence and can actively learn living habits of the user and manage and control all the products thereby so as to meet different demands of the user. In general, each human-computer interaction device automatically receives information sent by each connected product of the present room or region or actively queries the information of each connected product of the present room or region, or/and sends, according to data detected by its own sensing unit, an instruction after judgment and processing to the connected products of the room or region where the human-computer interaction device is placed or sends a related instruction to the other human-computer interaction devices, receives return information of each connected product or the other human-computer interaction devices or actively queries or detects related information of a certain effect supposed to be achieved after the product executes the instruction, performs displaying or broadcasting if an abnormal condition or failure occurs, and sends information to a mobile device of the user when detecting that no person is in the room, so as to implement automatic control and realize true intelligence; and a certain human-computer interaction device usually performs corresponding judgment or/and detection after receiving instructions sent by the other human-computer interaction devices and then performs processing, for example, if a householder falls asleep unwittingly and does not turn off lamps of the present bedroom, the bathroom and the living room, the human-computer interaction device in the present bedroom detects and judges that the householder has fallen asleep and then autonomously sends a lamp turning-off instruction to the lamp of the present bedroom and to the human-computer interaction devices of the other rooms or regions, and the human-computer interaction devices of the bathroom and the living room, after receiving the lamp turning-off instruction, judges that the lamps of the room or region are on and then sends a lamp turning-off instruction to the lamps controlled by same.

Each human-computer interaction device may receive an instruction inputted by the user whenever possible, parses the instruction and then sends a corresponding instruction to control or query other connected products, and the instruction includes one or more of speech, screen touch, human body action or press buttons. Each human-computer interaction device usually performs corresponding detection or/and judgment after responding to the instruction of the user and then performs processing, or the certain human-computer interaction device usually performs corresponding detection or/and judgment after receiving the instructions sent by the other human-computer interaction devices and then performs processing.

In a case that the human-computer interaction device is in an artificial intelligence mode or in a mode of receiving an instruction of the user, a human-computer interaction device in a certain room or region, when intended to control a certain connected product of the room or region or query a working condition of the certain connected product, sends a control or query instruction to the product so as to implement a control or query function, for example, if the user in a bedroom speaks "one degree higher" to the human-computer interaction device, the human-computer interaction device sends a control instruction of increasing for one degree subjected to semantic recognition to an air conditioner.

The human-computer interaction device in the certain room or region, when intended to control or query the connected products of the other rooms or regions, sends a control or query instruction including names of the other rooms or regions to the human-computer interaction devices of the other rooms or regions, the human-computer interaction devices, after receiving the instruction, perform corresponding judgment or detection and then implements the control or query instruction so as to implement a control or query function for the connected products of the other rooms or regions. For example, if "turn on a kitchen lamp" is spoken to the human-computer interaction device in the living room, the human-computer interaction device in the living room sends a corresponding instruction subjected to semantic recognition to the human-computer interaction device in the kitchen, and the human-computer interaction device in the kitchen detects that the kitchen lamp is off and then sends a lamp turning-on instruction to the kitchen lamp.

When the human-computer interaction device in the certain room or region is intended to implement linkage of two or more connected products of the same room or region or any one of the other rooms or regions, or implement linkage of the connected products of two or more rooms or regions, only a certain linkage function name needs to be sent, so the linkage function may be implemented, so as to realize whole house intelligence; and the two or more rooms or regions may not include the room or region where the human-computer interaction device receiving the linkage function name is placed; each human-computer interaction device related to linkage performs corresponding judgment or detection in advance and then performs processing. For example, “meal is ready” is spoken in the dining room, the human-computer interaction device in the dining room performs judgment after semantic recognition and discovers that a large lamp and a speaker device of the dining room are off and the curtain is not closed, and then sends a turning-on instruction to the large lamp and the speaker device of the dining room and a closing instruction to a curtain electric motor; for another example, if “whole-house ventilation” is spoken to any one of the human-computer interaction devices, all the human-computer interaction devices receive the instruction directly and indirectly, then perform corresponding judgment respectively, discover that all the windows and curtains are closed, and then each send a curtain opening instruction and a window opening instruction to a curtain electric motor and a window opener of the room or region where each human-computer interaction device is located so as to simultaneously open all the curtains and windows; and for yet another example, if “turn off an air conditioner downstairs” is spoken to any one of the human-computer interaction devices upstairs, the human-computer interaction device sends a corresponding instruction subjected to semantic recognition to the human-computer interaction devices of all the rooms or regions downstairs, these human-computer interaction devices discover that all the air conditioners are on after performing judgment and then each send a turning-off instruction to the air conditioner of the corresponding room or region downstairs.

Each human-computer interaction device performs various operations and processing on various information of products disconnected therewith or non-physical information or data autonomously or by responding to the instruction of the user or/and by sending a corresponding instruction to the other human-computer interaction devices, so as to implement various intelligent managements on the products disconnected therewith in a whole house and the non-physical data or information, and achieve more generalized whole house intelligence beyond common whole house intelligence.

In order to prevent disorder possibly caused when the plurality of adjacent human-computer interaction devices simultaneously respond to a speech instruction of the user, one of two ways may be adopted as a solution: 1, the adjacent human-computer interaction devices adopt different wake-up words. 2, The human-computer interaction device determines whether to respond to the instruction by detecting whether a person is in a room or a region where the human-computer interaction device is placed, which may adopt one or more detection technologies including sound wave, infrared, microwave and camera.

Whether the human-computer interaction device adopts automatic intelligent control or the user sends the instruction to the human-computer interaction device, the human-computer interaction device can display or broadcast a working condition of a controlled product or feedback information obtained after sending an instruction, failure or abnormal condition information stands out to be displayed or broadcast, and information is sent to a mobile terminal of the user if it is detected that no person is at home.

Various data collected by the sensing unit of the human-computer interaction device is displayed on a display screen of the present human-computer interaction device, and when the user needs these data on the other human-computer interaction devices, the other human-computer interaction devices send instructions including the name of the room or region where the human-computer interaction device is located and the needed data, and the human-computer interaction device, after receiving the instructions, sends these data to the other human-computer interaction devices to be displayed or speech-broadcast. Each human-computer interaction device may query and broadcast its own working condition.

The present disclosure is disclosed as above with exemplary embodiments, but is not limited by them. Any person of skill in the art can make possible variations and modifications without departing from the spirit and concept of the present disclosure, so the protection scope of the present disclosure should be subject to the claims of the present disclosure.

What is claimed is:

1. A composition of home system for implementing whole house intelligence, wherein the system is composed of a human-computer interaction device and a product connected therewith; the human-computer interaction device is put in a needed room, the human-computer interaction device in a certain room is connected with only a product in a room or in a region defined by the room and an adjacent room without the human-computer interaction device and sends a control or query instruction to the product autonomously or after responding to an instruction of a user so as to control it; all the human-computer interaction devices are connected directly or indirectly, and each human-computer interaction device sends a control or query instruction to other human-computer interaction devices autonomously or after responding to an instruction of the user so as to control products in rooms or local regions where the other human-computer interaction devices are put; and the instruction of the user to which the human-computer interaction devices respond comprises a speech instruction.

2. The composition of the home system for implementing the whole house intelligence according to claim 1, wherein the system further comprises at least one of data information of a product and a non-physical object which are disconnected with the human-computer interaction devices; each human-computer interaction device is configured to:

store various information of the products disconnected therewith in a present room or region, wherein, the various information is associated with a name of the present room or region; and/or store various non-physical data or information; and establish association with a name of a room or a local region when the data or the information is related to the room or the local region.

3. The composition of the home system for implementing the whole house intelligence according to claim 1, wherein the human-computer interaction device comprises a processing unit, a storage unit, an audio unit, a power source unit, a first communication unit and a second communication unit, and each unit is connected with the processing unit; the first communication unit is connected with only the products in the room or the region where the human-computer interaction device is put and comprises one or more of Wi-Fi, ZigBee, Bluetooth, Zwave, radio frequency, infrared and power-line communication; and the second communication unit is connected directly or indirectly with second communication units of the other human-computer interaction devices and comprises one of Wi-Fi, ZigBee, Bluetooth, Zwave and power-line communication.

4. The composition of the home system for implementing whole house intelligence according to claim 1, wherein the human-computer interaction device further comprises a display unit and further comprises a touch screen unit.

5. The composition of the home system for implementing whole house intelligence according to claim 1, wherein the human-computer interaction device further comprises a sensing unit, and the sensing unit comprises one or more of an infrared sensor, a microwave sensor, a temperature and humidity sensor, a carbon dioxide sensor, a PM2.5 sensor, a formaldehyde sensor, a light sensor, a gravity sensor and an acceleration sensor.

6. The composition of the home system for implementing whole house intelligence according to claim 3, wherein the human-computer interaction device further comprises a camera unit.

7. The composition of the home system for implementing whole house intelligence according to claim 6, wherein a camera of the camera unit and a microphone of the audio unit of the human-computer interaction device have a cover capable of being opened or closed manually, a cover opening and closing state signal accesses into the processing unit, and the processing unit may be in linkage with information of at least one of speech or a screen display during opening or closing, or performs relevant processing.

8. An intelligent implementing method for the composition of the home system for implementing whole house intelligence according to claim 1, wherein the human-computer interaction device of a certain room sends a control or query instruction to a certain connected product in the same room or region autonomously or after responding to an instruction of the user so as to implement control over or/and working condition query for the product, or receives information sent by a connected product in the same room or region so as to implement intelligence of the same room or region; the human-computer interaction device of the certain room sends a control or query instruction to one of the other human-computer interaction devices autonomously or after responding to an instruction of the user so as to implement control over or working condition query for a connected product of a room or a region where the one of the other human-computer interaction devices is located, or receives information sent by the connected product in the room or the region where the one of the other human-computer interaction devices is located so as to implement cross-room or cross-region intelligence; the human-computer interaction device of the certain room sends a control or query instruction to a plurality of connected products in the room or the region autonomously or after responding to a linkage instruction of the user, or simultaneously sends the control or query instruction to human-computer interaction device(s) in one or more of other rooms or regions, or does not send the instruction to the connected product in the room or the region but sends the control or query instruction only to the human-computer interaction device(s) in one or more of the other rooms so as to implement linkage control over or working condition query for a plurality of connected products in any one or more of rooms or regions, so that whole house intelligence is achieved; or each human-computer interaction device performs various operations and processing on various information of a connected product or a disconnected product or non-physical information or data in response to the instruction of the user or/and by sending a corresponding instruction to the other human-computer interaction devices, so as to implement various intelligent managements for all products in a whole house and non-physical data or information and achieve generalized whole house intelligence beyond common whole house intelligence; each human-computer interaction device generally performs corresponding judgment or/and detection after responding to the instruction of the user or after a certain human-computer interaction device receives an instruction sent by the other human-computer interaction devices and then perform processing; and the instruction of the user to which the human-computer interaction device responds comprises the speech instruction.

9. The intelligent implementing method according to claim 8, wherein query of each human-computer interaction device comprises the working condition query for itself or for the other human-computer interaction devices, and a result is displayed or/and broadcast.

10. The intelligent implementing method according to claim 8, wherein each human-computer interaction device stores a name of the present room or region and information of a product in the room or the region and connected with the device, establishes association between the name and the information of the product, and stores names and product information of rooms or regions where the other human-computer interaction devices are put; and information stored in each device is updated synchronously.

11. The intelligent implementing method according to claim 8, wherein the human-computer interaction device, when responding to the instruction of the user, recognizes whether the instruction comprises a room or region name; and in response to the case that the instruction does not comprise a room or region name, judges as control over or query for the product in the present room or region; and in response to the case that the instruction comprises a room or region name, sends a control or query instruction to the human-computer interaction device of a room or a region according to a name of the room or the region comprised in the instruction.

12. The intelligent implementing method according to claim 8, wherein the human-computer interaction device receives return information of various connected products, or actively queries or detects related information obtained after the connected device executes the instruction, and may perform displaying or broadcasting; and makes displaying or broadcasting stand out when an abnormal condition or failure occurs, and sends information to a mobile device of the user when detecting that no person is in a room.

13. A method for the human-computer interaction device responding to the speech instruction of the user according to claim 1, wherein in order to prevent disorder caused by possibly simultaneously response of a plurality of adjacent human-computer interaction devices, one of two way is adopted: 1, the human-computer interaction device determines whether to respond to the speech instruction made by the user by detecting whether a person is in a room or a region where the human-computer interaction device is put, which may adopt one or more detection technologies comprising sound wave, infrared, microwave and camera; and 2, the adjacent human-computer interaction devices adopt different wake-up words.

* * * * *